US009063014B2

United States Patent
Nagata et al.

(10) Patent No.: US 9,063,014 B2
(45) Date of Patent: Jun. 23, 2015

(54) PHOTODETECTOR CONTROL CIRCUIT TO CONTROL DRIVE OF A PHOTODIODE AND CURRENT DETECTION OF A PHOTOTRANSISTOR

(71) Applicant: Semiconductor Components Industries, LLC, Phoenix, AZ (US)

(72) Inventors: Yasunori Nagata, Gifu-ken (JP); Yoshihisa Tabuchi, Gifu-ken (JP)

(73) Assignee: Semiconductor Components Industries, LLC, Phoenix, AZ (US)

(*) Notice: Subject to any disclaimer, the term of this patent is extended or adjusted under 35 U.S.C. 154(b) by 152 days.

(21) Appl. No.: 13/714,032

(22) Filed: Dec. 13, 2012

(65) Prior Publication Data

US 2013/0187029 A1    Jul. 25, 2013

(30) Foreign Application Priority Data

Dec. 13, 2011 (JP) ................... 2011-272016

(51) Int. Cl.
*H01J 40/14* (2006.01)
*G01J 1/42* (2006.01)
*G01J 1/18* (2006.01)
*G01J 1/44* (2006.01)

(52) U.S. Cl.
CPC ............. *G01J 1/4228* (2013.01); *G01J 1/18* (2013.01); *G01J 1/44* (2013.01); *G01J 2001/186* (2013.01)

(58) Field of Classification Search
USPC ............ 250/214 R, 214.1, 205, 238, 214 SW, 250/214 P; 327/514
See application file for complete search history.

(56) References Cited

U.S. PATENT DOCUMENTS

| | | | | |
|---|---|---|---|---|
| 4,059,835 A | * | 11/1977 | Kawasaki et al. | ............. 396/228 |
| 2009/0128229 A1 | | 5/2009 | Watanabe et al. | |
| 2009/0153679 A1 | | 6/2009 | Nagata et al. | |
| 2009/0160958 A1 | | 6/2009 | Yamada et al. | |
| 2012/0154614 A1 | | 6/2012 | Moriya et al. | |

FOREIGN PATENT DOCUMENTS

| | | |
|---|---|---|
| JP | 2006-227274 A | 8/2006 |
| JP | 2009128400 A | 6/2009 |

(Continued)

OTHER PUBLICATIONS esp@cenet Patent Abstract for Japanese Publication No. 2009-128400, publication date Jun. 11, 2009. (1 page).

(Continued)

*Primary Examiner* — Que T Le
(74) *Attorney, Agent, or Firm* — Robert F. Hightower

(57) ABSTRACT

A photodetector control circuit in a photodetector for detecting light from a photodiode using a phototransistor and controls drive of the photodiode and detection of a current of the phototransistor has a received light amount detecting unit that detects a detection current, which flows through the phototransistor in accordance with a received light amount, by converting the detection current into a detection voltage, and compares the detection voltage with a reference voltage detected during reception of a reference light amount, to thereby detect a change in the received light amount, a diode current control unit for controlling a diode current that is caused to flow through the photodiode, and a control unit that detects a temperature based on a forward drop voltage of the photodiode and estimates a current change rate of the phototransistor based on the detected temperature.

6 Claims, 2 Drawing Sheets

(56) References Cited

FOREIGN PATENT DOCUMENTS

| | | |
|---|---|---|
| JP | 2009-145634 A | 7/2009 |
| JP | 2009-151203 A | 7/2009 |
| JP | 2009-156947 A | 7/2009 |
| JP | 2010-032965 A | 2/2010 |
| JP | 2011-065140 A | 3/2011 |

OTHER PUBLICATIONS esp@cenet Patent Abstract for Japanese Publication No. 2009-156947, publication date Jul. 16, 2009. (1 page).

esp@cenet Patent Abstract for Japanese Publication No. 2006-227274, publication date Aug. 31, 2006. (1 page).

esp@cenet Patent Abstract for Japanese Publication No. 2009-145634, publication date Jul. 2, 2009. (1 page).

esp@cenet Patent Abstract for Japanese Publication No. 2009-151203, publication date Jul. 9, 2009. (2 pages).

esp@cenet Patent Abstract for Japanese Publication No. 2010-032965, publication date Feb. 12, 2010. (1 page).

esp@cenet Patent Abstract for Japanese Publication No. 2011-065140, publication date Mar. 31, 2011. (1 page).

* cited by examiner

PHOTODETECTOR CONTROL CIRCUIT TO CONTROL DRIVE OF A PHOTODIODE AND CURRENT DETECTION OF A PHOTOTRANSISTOR

BACKGROUND

1. Technical Field

The present invention relates to a photodetector control circuit which is provided in a photodetector for detecting light from a photodiode using a phototransistor, and which controls drive of the photodiode and detection of a current of the phototransistor.

2. Background Art

Conventionally, various cameras are provided with a vibration compensation function. The vibration compensation is achieved by moving the lens in accordance with camera movement to thereby obtain an image in which vibrations are compensated for. In order to execute this vibration compensation, the lens must be driven appropriately, and this requires accurate detection of the lens position.

For detecting positions of various components, there has been provided an arrangement in which a magnet is mounted on the target component and a Hall element for detecting this magnet is used. A Hall element is also being used for detecting a lens position.

CITATION LIST

Patent Literature

[Patent Literature 1] JP 2009-128400 A
[Patent Literature 2] JP 2009-156947 A
[Patent Literature 3] JP 2006-227274 A

SUMMARY

However, a Hall element is relatively costly. Moreover, for applications such as cameras in cell phones and smartphones where space reduction is required, or special device shapes are desired by users, it may not be possible to sufficiently satisfy such requirements or desires when a Hall element is used. It is therefore necessary to consider alternative detection methods. For example, one alternative detection method may be an optical detection method, in which a photodetector such as a photo-reflector or a photo-interrupter may be used. A photo-reflector is a device in which light emitted from a photodiode is reflected off a target and the reflected light is detected using a phototransistor. By configuring such that the received light amount at the phototransistor varies depending on lens position, the position of the lens can be detected.

Since a photodetector such as the above-described photo-reflector is influenced by temperature, the issue of temperature compensation must be addressed.

Solution to Problem

The present invention provides a photodetector control circuit, which is provided in a photodetector that uses a phototransistor to detect reflected light obtained by reflecting light emitted from a photodiode, and which controls drive of the photodiode and detection of a current of the phototransistor. The photodetector control circuit comprises: a received light amount detecting unit that detects a detection current, which flows through the phototransistor in accordance with a received light amount, by converting the detection current into a detection voltage, and compares the detection voltage with a reference voltage detected during reception of a reference light amount, to thereby detect a change in the received light amount; a diode current control unit for controlling a diode current that is caused to flow through the photodiode; a voltage detecting unit for detecting a temperature based on a forward drop voltage of the photodiode; an estimating unit for estimating a current change rate of the phototransistor based on the temperature detected by the voltage detecting unit; a converter unit for multiplying the change rate estimated by the estimating unit by a preset coefficient to thereby convert the phototransistor current change rate into a diode current change rate; and a modifying unit for controlling the diode current control unit to modify the diode current in accordance with the diode current change rate obtained by the converter unit. The detection voltage is corrected by modifying the diode current according to temperature, so as to carry out temperature compensation of the detection voltage.

Preferably, the estimating unit includes a table indicating the temperature and a current change rate of the photodiode, and acquires the diode current change rate of the photodiode based on this table.

Preferably, the coefficient in the converter unit is a fixed value, and the converter unit includes a multiplier for multiplying the phototransistor current change rate by this coefficient.

Preferably, the modifying unit includes an adder for adding, to a diode current reference value, a diode current change amount in accordance with the change rate obtained by the converting unit.

The present invention further provides a photodetector control circuit, which is provided in a photodetector that detects light from a photodiode using a phototransistor, and which controls drive of the photodiode and detection of a current of the phototransistor. The photodetector control circuit comprises: a received light amount detecting unit that detects a detection current, which flows through the phototransistor in accordance with a received light amount, by converting the detection current into a detection voltage, and compares the detection voltage with a reference voltage detected during reception of a reference light amount, to thereby detect a change in the received light amount; a diode current control unit for controlling a diode current that is caused to flow through the photodiode; a temperature detecting unit for detecting a temperature based on a forward drop voltage of the photodiode; an estimating unit for estimating a current change rate of the phototransistor based on the temperature detected by the voltage detecting unit; and a correcting unit for correcting the detected phototransistor current in accordance with the current change rate estimated by the estimating unit. Temperature compensation is carried out by correcting the phototransistor current by means of the correcting unit.

Preferably, the correcting unit includes an operational amplifier for comparing the detection voltage with the reference voltage, and the detection voltage is corrected by correcting the reference voltage by means of the correcting unit.

According to the present invention, effective temperature compensation can be executed by detecting the temperature in accordance with the forward drop voltage of the photodiode, and by controlling the photodiode current or the phototransistor current based on the detected temperature.

DETAILED DESCRIPTION

The embodiments of the present invention are described below with reference to the attached drawings.

Figure 1:
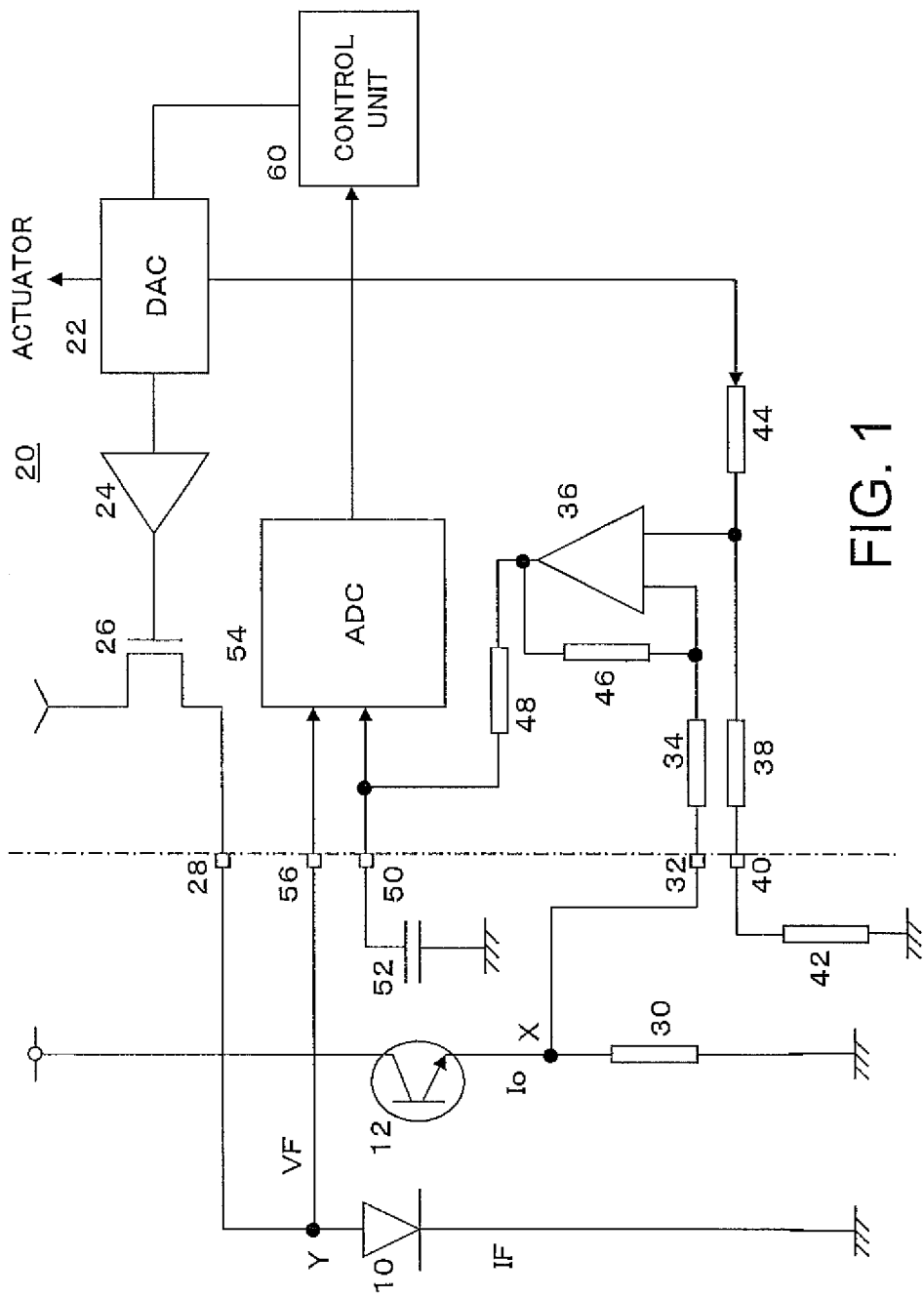
FIG. 1 is a diagram showing a configuration of a photodetector (photo-reflector) control circuit according to an embodiment of the present invention.

FIG. 1 is a diagram showing a configuration of a photodetector control circuit (or photo-reflector control circuit) employing a photo-reflector according to an embodiment of the present invention. The photo-reflector, which is a photodetector, includes a photodiode 10 and a phototransistor 12, which are provided external to a semiconductor integrated circuit 20. When light emitted from the photodiode 10 is reflected off a detection target and the reflected light is introduced into the phototransistor 12, a current according to the incident light amount flows through the phototransistor 12. Even while the amount of emitted light from the photodiode 10 remains constant, when the detection target is moved in accordance with the lens position, the received light amount at the phototransistor 12 varies. By detecting the amount of current through the phototransistor 12, the lens position is detected. Since the lens position should be detected along two directions of x and y, two photo-reflectors are provided to detect the lens position in both the x and y directions. A reflector plate or the like attached to the lens serves as the detection target.

In the semiconductor integrated circuit 20, based on input data concerning a constant current to be caused to flow through the photodiode 10, a DAC 22 outputs a corresponding constant voltage. The output from the DAC 22 is stabilized by an amplifier 24 and subsequently supplied to the gate of an n-channel output transistor 26. The drain of the output transistor 26 is connected to a power supply, while the source of the output transistor 26 is connected via a terminal 28 to the anode of the externally-provided photodiode 10. The cathode of the photodiode 10 is grounded. Accordingly, a constant current IF in accordance with the data input to the DAC 22 is supplied from the power supply to the photodiode 10 via the output transistor 26. It may be preferable to provide a means for controlling the constant current IF, which may include a structure that detects a current flowing through the output transistor 26 and provides feedback control to the data input to the DAC 22.

The collector of the phototransistor 12 is connected to a power supply, while the emitter of the phototransistor 12 is grounded via a current detecting resistor 30. Accordingly, as described above, a current in accordance with the light amount received at the phototransistor 12 flows through the phototransistor 12 and the current detecting resistor 30. Further, a detection voltage ("point-X voltage") in accordance with the current flowing through the phototransistor 12 is obtained at point X (i.e., point of connection between the phototransistor 12 and the current detecting resistor 30) located above the current detecting resistor 30.

The point-X voltage is introduced into the semiconductor integrated circuit 20 via a terminal 32, and input to the negative input terminal of an operational amplifier 36 via a resistor 34. The positive input terminal of the operational amplifier 36 is connected via a resistor 38, a terminal 40, and an external resistor 42, to ground outside the semiconductor integrated circuit 20. Further, the positive input terminal of the operational amplifier 36 is also connected to one end of a resistor 44. To the other end of this resistor 44, the DAC 22 supplies a reference voltage indicative of the phototransistor 12 current obtained when the lens is located at a reference position. As such, the voltage at the positive input terminal of the operational amplifier 36 is equal to a voltage ("set voltage") obtained by dividing the reference voltage by the resistor 44 and a sum of the resistor 38 and the external resistor 42. The reference voltage is set according to a reference voltage data supplied to the DAC 22. The set voltage at the positive input terminal of the operational amplifier 36 can be adjusted by changing the reference voltage data input to the DAC 22 or by changing the resistance value of the external resistor 42.

The output terminal of the operational amplifier 36 is connected as feedback to its negative input terminal via a resistor 46. Accordingly, the voltage at the output terminal of the operational amplifier 36 is equal to a voltage obtained by amplifying a voltage difference between the positive and negative input terminals in accordance with the resistance values of the resistors 34 and 46.

Further, the output terminal of the operational amplifier 36 is also connected via a resistor 48 and a terminal 50 to a capacitor 52, which has its other end connected to ground outside the semiconductor integrated circuit 20. With this arrangement, a voltage signal obtained by integrating (subjecting to low-pass filtering) the output from the operational amplifier 36 is obtained at the terminal 50. This voltage signal of the terminal 50 is input to the ADC 54. In other words, the ADC 54 receives input of a voltage corresponding to a difference between the detection voltage, which corresponds to the amount of current that flows in the phototransistor 12 in accordance with the received light amount, and the set voltage. Therefore, in an output from the ADC 54, data in accordance with the lens position can be obtained.

The output from the ADC 54 is supplied to a control unit 60, and the lens position is identified in the control unit 60. The control unit 60 performs various controls in accordance with the obtained lens position, such as control of a lens driving actuator. The actuator may be controlled by, for example, driving an H-Bridge driver with a PWM pulse.

According to the configuration of the present embodiment, the current Io of the phototransistor 12 is converted into a voltage and compared with the set voltage, and the comparison result is used to detect the lens position. Although a conversion is made, the detection of the lens position is in fact made on the basis of the current Io.

Further, according to the present embodiment, the voltage (forward drop voltage) at point Y located on the anode side of the photodiode 10 is supplied to the ADC 54 via a terminal 56. The forward drop voltage of the photodiode 10 varies depending on temperature. Since the forward drop voltage can be regarded as having a proportional relationship to temperature, the value obtained by subjecting the point-Y voltage to AD conversion can be used as data indicative of the temperature.

The output from the ADC 54 is supplied to the control unit 60. The control unit 60 detects the lens position in accordance with the amount of current through the phototransistor 12. While the control unit 60 performs processes in accordance with the detected lens position, the control unit 60 also performs temperature compensation processing with respect to the detected position in accordance with temperature. Specifically, the control unit 60 controls the current to be supplied to the photodiode 10 based on the received forward drop voltage of the photodiode 10.

Figure 2:
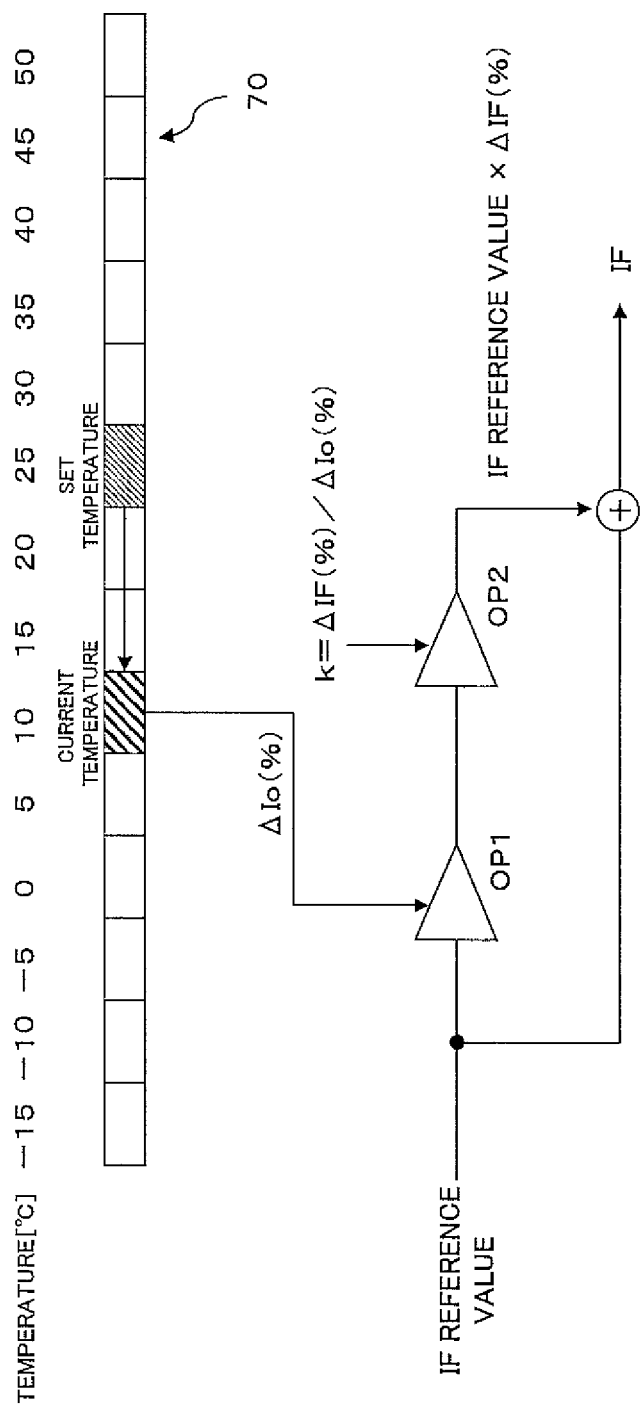
FIG. 2 is a diagram showing an example configuration of a control unit that carries out temperature compensation.

FIG. 2 shows an example configuration of the control unit 60. The control unit 60 detects the temperature based on the received forward drop voltage of the photodiode 10. Since the forward drop voltage is proportional to temperature as mentioned above, the forward drop voltage may be multiplied by a coefficient, or may be recognized as a value indicative of the temperature.

The control unit 60 contains therein a table 70 indicating the relationship between temperature and current change rate ΔIo(%) of the phototransistor 12. Specifically, as shown in the upper part of FIG. 2, the table 70 stores, in correlation to each temperature, a value of ΔIo(%) at that temperature. In response to a detected temperature, a corresponding current change rate ΔIo(%) is obtained, and the obtained ΔIo(%) is multiplied by the IF reference value in an operational amplifier OP1. Further, the output from the operational amplifier OP1 is input to an operational amplifier OP2, where it is multiplied by a fixed coefficient ΔIF(%)/ΔIo(%). As such, (IF reference value)×ΔIF(%), which denotes an amount of change in the current IF due to the temperature change, is obtained as the output from the operational amplifier OP2. This IF change amount is added to the IF reference value in an adder, to thereby obtain a current IF which compensates for a current change of the phototransistor 12 due to temperature.

As described above, according to the present embodiment, ΔIo(%) expressing the rate of change of Io relative to temperature is stored in the table. Accordingly, the table can be employed regardless of the magnitude of Io at that point. Further, by converting the obtained ΔIo(%) into ΔIF(%) and multiplying the resulting value by the IF reference value, an IF value capable of correcting Io can be obtained regardless of the magnitude of Io at that point. Therefore, appropriate temperature compensation for Io can be performed without considering the magnitude of Io at that point.

The lens position is detected along the two directions of x and y. For this purpose, the photodiode 10 and the phototransistor 12 are provided in two sets for the x and y directions, respectively, and the two detected position values are recognized in the control unit 60. In this case, temperature detection may be performed using the forward drop voltage of only one of the photodiodes 10. Further, it is desirable to have the DAC 22 and the ADC 54 carry out processing for both the x and y directions in a time-divided manner.

In the above-described embodiment, the current IF of the photodiode 10 is modified to perform temperature compensation of the phototransistor 12 current Io. Alternatively, it is possible to modify the reference value of the current Io in accordance with the detected temperature so as to shift the output of the operation amplifier 36.

More specifically, based on the detected forward drop voltage of the photodiode 10 (which corresponds to the temperature), a phototransistor 12 current change rate ΔIo(%) is obtained, and the reference voltage to be supplied to the positive input terminal of the operational amplifier 36 is modified in accordance with the obtained ΔIo. For example, by modifying according to (reference voltage)×(1ΔIo(%)), the set voltage (corresponding to the offset voltage) based on the reference voltage can be shifted. In this way, the output of the operational amplifier 36 can be shifted relative to the point-X voltage, to thereby carry out temperature compensation of the detected Io.

REFERENCE SIGNS LIST 10 photodiode; 12 phototransistor; 20 semiconductor integrated circuit; 24 amplifier; 26 output transistor; 28, 32, 40, 50, 56 terminal; 30 current detecting resistor; 34, 38, 42, 44, 46, 48 resistor; 36 operational amplifier; 52 capacitor; 60 control unit; 70 table.

The invention claimed is:

1. A photodetector control circuit, which is provided in a photodetector for detecting light from a photodiode using a phototransistor, and which controls drive of the photodiode and detection of a current of the phototransistor, the photodetector control circuit comprising:
   a received light amount detecting unit that detects a detection current, which flows through the phototransistor in accordance with a received light amount, by converting the detection current into a detection voltage, and compares the detection voltage with a reference voltage detected during reception of a reference light amount, to thereby detect a change in the received light amount;
   a diode current control unit for controlling a diode current that is caused to flow through the photodiode;
   a control unit that detects a temperature based on a forward drop voltage of the photodiode, estimates a current change rate of the phototransistor based on the detected temperature, multiplies the estimated change rate by a preset coefficient to thereby convert the phototransistor current change rate into a diode current change rate, and controls the diode current control unit to modify the diode current in accordance with the obtained diode current change rate.

2. The photodetector control circuit according to claim 1, wherein the control unit includes a table indicating the temperature and a current change rate of the photodiode, and acquires the diode current change rate of the phototransistor based on this table.

3. The photodetector control circuit according to claim 1, wherein
   the coefficient in the control unit is a fixed value, and
   the control unit includes a multiplier for multiplying the phototransistor current change rate by this coefficient.

4. The photodetector control circuit according to claim 1, wherein the control unit includes an adder for adding, to a diode current reference value, a diode current change amount in accordance with the change rate.

5. A photodetector control circuit, which is provided in a photodetector for detecting light from a photodiode using a phototransistor, and which controls drive of the photodiode and detection of a current of the phototransistor, the photodetector control circuit comprising:
   a received light amount detecting unit that detects a detection current, which flows through the phototransistor in accordance with a received light amount, by converting the detection current into a detection voltage, and compares the detection voltage with a reference voltage detected during reception of a reference light amount, to thereby detect a change in the received light amount;
   a diode current control unit for controlling a diode current that is caused to flow through the photodiode;
   a temperature detecting unit for detecting a temperature based on a forward drop voltage of the photodiode; and
   a control unit that estimates a current change rate of the phototransistor based on the temperature detected by the temperature detecting unit, and corrects the detected phototransistor current in accordance with the estimated current change rate.

6. The photodetector control circuit according to claim 5, wherein the control unit includes an operational amplifier for comparing the detection voltage with the reference voltage, and the detection voltage is corrected by correcting the reference voltage by means of the received light amount detecting unit.

* * * * *